(12) United States Patent
Chen et al.

(10) Patent No.: US 7,814,370 B2
(45) Date of Patent: Oct. 12, 2010

(54) WAKE ON LAN (WOL) TEST SYSTEM AND METHOD THEREOF

(75) Inventors: Chien-Lin Chen, Taipei (TW); Teng-Chih Yang, Taipei (TW)

(73) Assignee: Inventec Corporation, Taipei (TW)

( * ) Notice: Subject to any disclaimer, the term of this patent is extended or adjusted under 35 U.S.C. 154(b) by 428 days.

(21) Appl. No.: 12/000,743

(22) Filed: Dec. 17, 2007

(65) Prior Publication Data

US 2009/0158097 A1    Jun. 18, 2009

(51) Int. Cl.
G06F 11/00 (2006.01)
(52) U.S. Cl. ....................................................... 714/32
(58) Field of Classification Search ................. 714/4, 714/18, 25–27, 31, 32, 36–39, 43–48, 56
See application file for complete search history.

(56) References Cited

U.S. PATENT DOCUMENTS

| | | | |
|---|---|---|---|
| 6,158,020 A * | 12/2000 | Locker et al. ................. 714/13 |
| 6,477,602 B1 * | 11/2002 | Loison ........................ 710/301 |
| 7,251,736 B2 * | 7/2007 | Dayan et al. ................. 713/310 |
| 2003/0212932 A1 * | 11/2003 | Sauber et al. ............... 714/712 |
| 2005/0086460 A1 * | 4/2005 | Huang ............................ 713/2 |
| 2008/0028242 A1 * | 1/2008 | Cepulis ...................... 713/320 |
| 2008/0229091 A1 * | 9/2008 | Abu-Akel ....................... 713/2 |
| 2009/0133040 A1 * | 5/2009 | Stevens, IV ................. 719/315 |
| 2009/0210519 A1 * | 8/2009 | Zill et al. ..................... 709/220 |
| 2009/0241113 A1 * | 9/2009 | Seguin et al. ................... 718/1 |

* cited by examiner

*Primary Examiner*—Nadeem Iqbal
(74) *Attorney, Agent, or Firm*—CKC & Partners Co., Ltd.

(57) ABSTRACT

The invention presents a Wake On LAN (WOL) test system and method thereof, wherein the system is applied for a client/server structure with the ILO (Integrated Lights-Out) inside server platform. The system is composed of an examiner end, an examinee end and a network domain. And through the WOL test module automates the WOL test procedure.

2 Claims, 4 Drawing Sheets

WAKE ON LAN (WOL) TEST SYSTEM AND METHOD THEREOF

BACKGROUND

1. Field of Invention

The present invention relates to a Wake On LAN (WOL) test system and method thereof. More particularly, the present invention relates to a Wake On LAN (WOL) test system and method thereof under a Client/Server structure with an ILO remote management service platform.

2. Description of Related Art

When testing the Wake On LAN (WOL) function of the network card, the QA engineer must make repeated round trips between the waking end and the woken end. First, the waking end must has a DHCP server function computer connected to a switch hub with WOL software installed, such as AMD Power Magic Utility. The MAC ID of the network card on the woken end can be obtained from the ROM-Based Setup Utility (RBSU) or the Operation System (OS). And the woken end must connect to the network domain of the waking end. During the WOL test, the QA engineer must apply the hibernate function or power shutdown on the woken end, and go to the waking end to implement the WOL software, and then manually key in the MAC ID of the woken end to send the WOL Magic Packet via the WOL software. The QA engineer then has to go back to the woken end to check if the computer has woken up. As the above-mentioned procedure, that is a single test for one network card. Though for testing all the network cards of the woken end, it is necessary to repeat the above-mentioned procedure until every network card has been test.

The WOL test options includes: the WOL test in hibernation under Windows OS, the WOL test after system shutdown under Windows OS, the WOL test in switch button-triggered hibernation under Windows OS, the WOL test after switch button shutdown under Windows OS, the WOL test after switch button shutdown under Unix & Unix-Like Operation System, etc.

The present WOL test using the above-mentioned procedure to test a single network card for only one test option, and to repeat the same procedure to test another network card, until all the network cards have been tested. During the test procedures and operations, the manpower and the procedures of accessing the MAC IDs, keying in the MAC IDs from the waking end and sending WOL Magic Packets are time-consuming. And the omissions and mistakes of manpower testing are hard to prevent.

SUMMARY

For this reason, this invention provides a Wake On LAN (WOL) test system and method thereof, applying in such as the Windows operation system, the Unix operation system and the Linux operation system with the Client/Server structure of an examiner end and an examinee end. The WOL test system sends the MAC ID of all the network cards of the examinee end by the WOL module. The WOL module retrieves the MAC ID of the examinee end from the MAC ID list to enclose in a WOL Magic Packet, and sends the magic packet to the examinee end to wake on LAN.

The invention relates to the ILO management platform. By the communication under the ILO remote management platform, the power condition of the examining target is acknowledged accurately. That is, when sending out the "Shutdown" or "Hibernate" command, it is possible to query the condition of the examinee end computer and whether the command is executed correctly via the ILO management platform. Thus, after sending out the WOL Magic Packet in the test system of the invention, it is possible to acknowledge that the examinee end computer has woken up. But if the WOL Magic Packet fails to send, the system will re-send the WOL Magic Packet again automatically. The reacting time of the system is as short as a man-made test, but it reduces the key-in time of manpower. Nevertheless, when the WOL Magic Packet fails to send multiple times, the system will send out "Power On" packet direct to the examinee end computer via the ILO management platform to start up the examinee end computer and continue the next test stage, instead of canceling the test.

The test configuration set via the WOL test module user interface of the invention, it simplifies the above-mentioned complicated procedure of "Shutdown" or "Hibernate" command as the condition variables through the Application Program Interface (API), or the System Message Post or the Event Post to the examinee end computer. And, the test method of WOL of the invention examines all the network cards in sequence, according to the automatically set condition variables such as shutdown or hibernate, MAC ID retrieving, the magic packet sending, Wake On LAN, and continuing test toward the next network card. Thus the invention improves the primitive WOL test procedure only operated through manpower, and reduces the testing manpower and time. Furthermore, the WOL test module user interface of the invention provides displaying instantaneous test progresses and test results in HTML format. It is able to highlight test results in different colors as HTML files, for instance, displaying failing results in red as well as displaying successful results in blue, to simplify the querying.

Therefore, the Wake On LAN (WOL) test system of the invention takes the place of using humans to do the testing, reduces time used, and prevents omissions caused by human error thereby improving the entire efficiency of WOL test. The testing time of applying the test system and method of the invention is around 30~50 minutes and less. Comparing to the sum of the testing time of the traditional test operation around 1~1.5 hours, the efficiency is increased by about 40%~50%.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
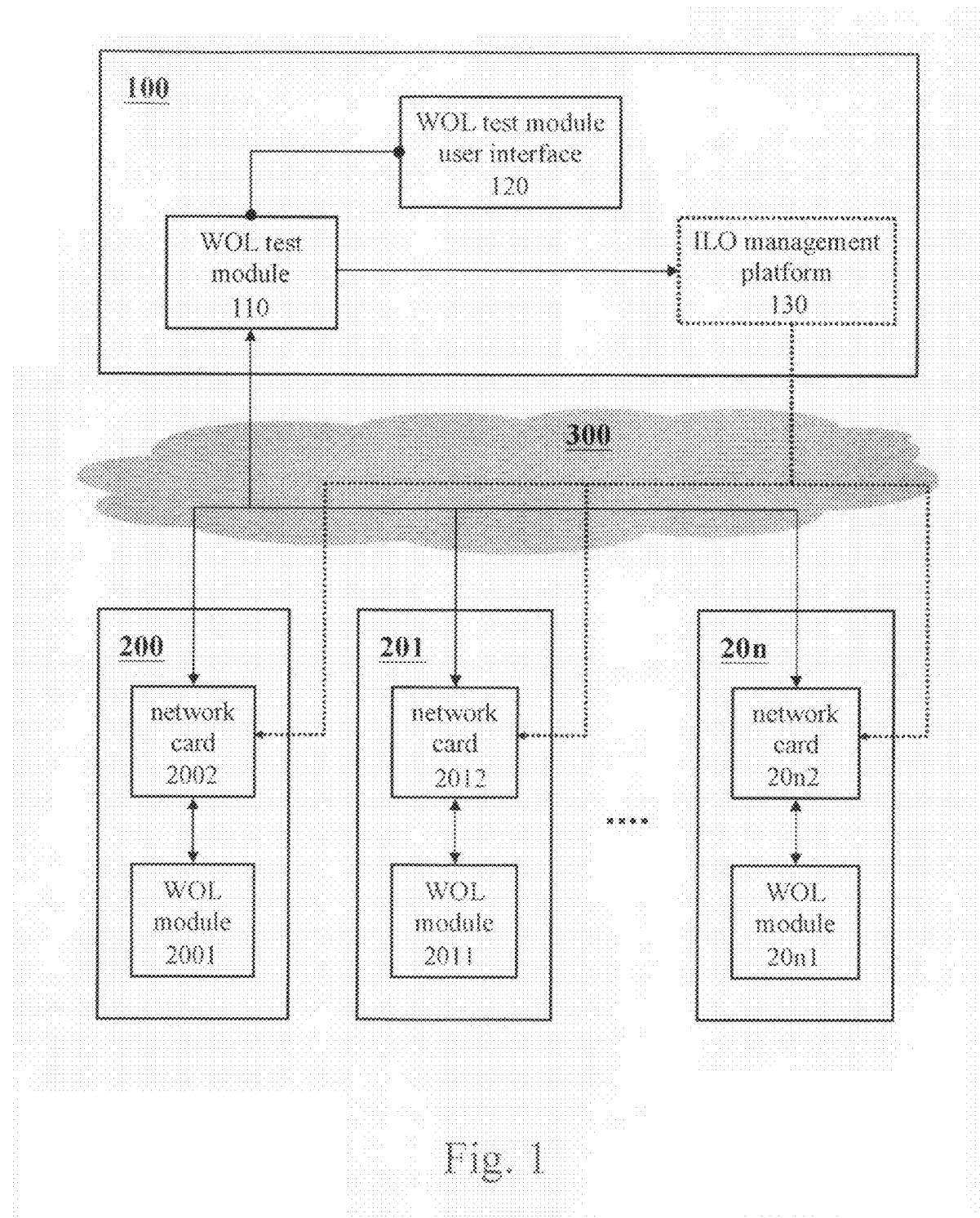
FIG. 1 is the block diagram of the preferred embodiment of the Wake On LAN (WOL) test system of this invention.

The invention provides a Wake On LAN (WOL) test system and method thereof, applied in a system with a Client/Server structure with an examiner end and at least an examinee end. The Wake On LAN test is initiated on the examinee end through the WOL test module of the examiner end, and instantaneously acknowledges the WOL condition via the ILO management platform, and achieving the automation of the WOL test.

Reference will now be made in detail to the present embodiments of the invention, examples of which are illustrated in the accompanying drawings. Wherever possible, the same reference numbers are used in the drawings and the description to refer to the same or like parts.

Refer to FIG. 1. FIG. 1 is the block diagram of the preferred embodiment of the Wake On LAN test system of this invention. As shown in FIG. 1, the WOL test system is implemented in a system with an ILO management platform and comprises an examiner end 100, examinee ends 200~20n and a network domain 300. The examinee ends 200~20n respectively has WOL modules 2001~20n1 and network cards 2002~20n2. The WOL modules 2001~20n1 retrieve the MAC ID of network cards 2002~20n2 and uploading information, e.g. the MAC ID, to the examiner end 100. When the WOL modules 2001~20n1 receives the magic packet, the WOL module 2001~20n1 will wake the examinee ends 200~20n. The examiner end 100 comprises a WOL test module 110, a WOL test module user interface 120, and an ILO management platform 130, wherein the ILO management platform 130 is the remote management service platform provided by the ILO (Integrated Lights-Out) chip on the system board. The ILO management platform 130 enables the server of the examiner end 100 to connect to the network cards 2002~20n2 via the network and remotely control the computers of the examinee ends 200~20n. And the WOL test module user interface 120 is the user interface of the WOL test module 110. Reference will be made in detail with the accompanying drawing of the WOL test module user interface 120 as follows.

Figure 3:
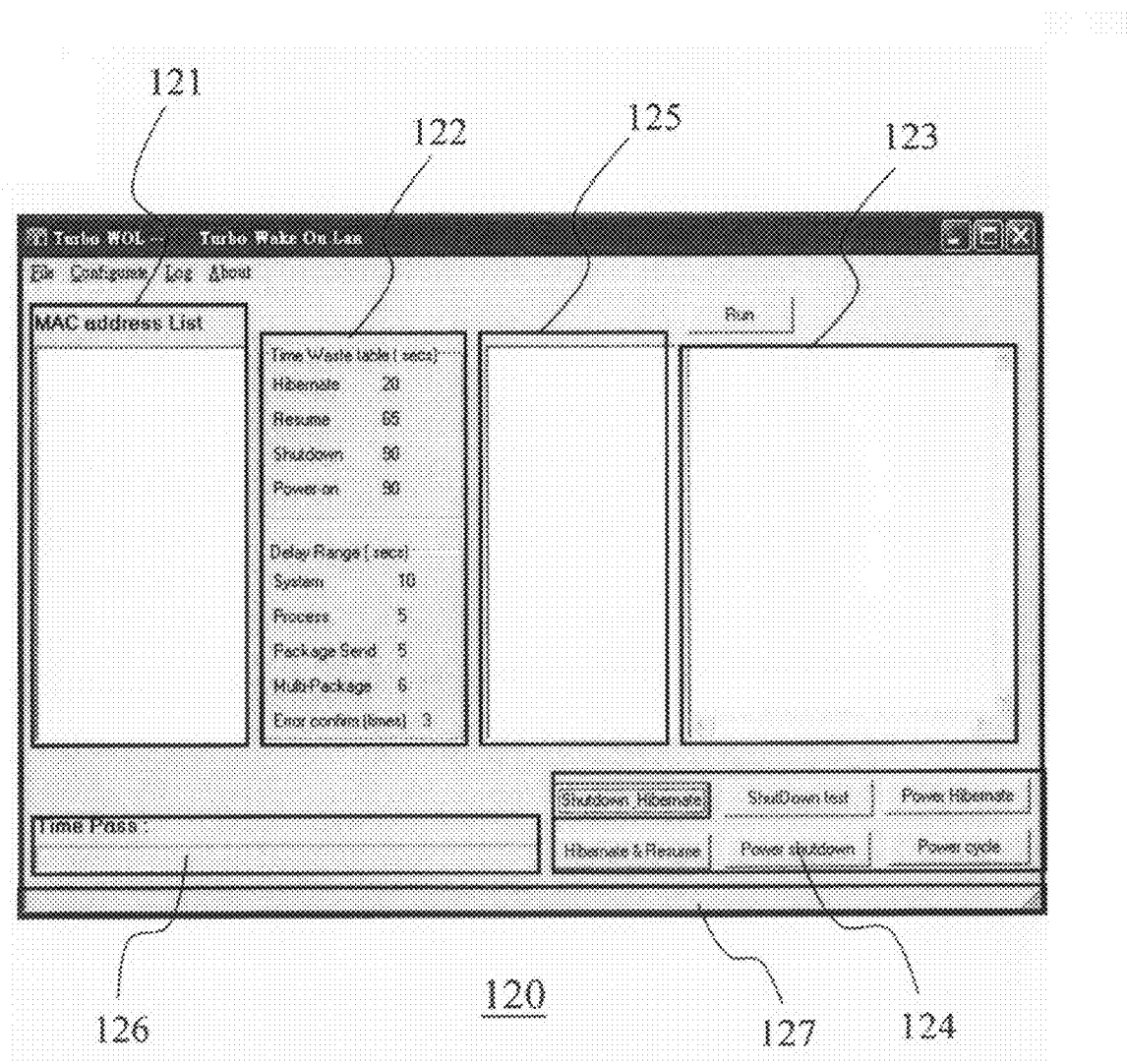
FIG. 3 illustrates the WOL test module user interface of the preferred embodiment of this invention.

Refer to FIG. 3. FIG. 3 illustrates the WOL test module user interface of the preferred embodiment of this invention. The WOL module user interface 120 provides setting a test configuration toward at least one of the examinee ends 200. As shown in FIG. 3, the WOL module user interface 120 comprises functions such as a MAC ID list 121, a test configuration list 122, an instantaneous test info 123, test function option 124, a test event list 125, a test elapsing time 126, and the current test event 127, etc. Wherein the MAC ID list 121 displays the MAC IDs of the network cards 2002~20n2 in the examinee ends 200~20n gathered by the examiner end 100. The test configuration list 122 sets a test configuration for at least one of the examinee ends 200, such as a system buffer time, a module processing buffer time, a magic packet sending interval, the number of successful WOL, and the number WOL failures etc. The instantaneous test info 123 provides displaying instantaneous test progresses and test results in HTML format. The test function option 124 comprises any combinations of the Shutdown/Hibernate the Shutdown Test, the Power Hibernate, the Hibernate & Resume, the Power Shutdown, and the Power Cycle. The test event list 125 displays all of the test function options of the examinee end in a batch. The test elapsing time 126 provides displaying the total elapsing time of the test. And the current test event 127 provides displaying the current test proceeding toward the examinee end 200.

Figure 2A:
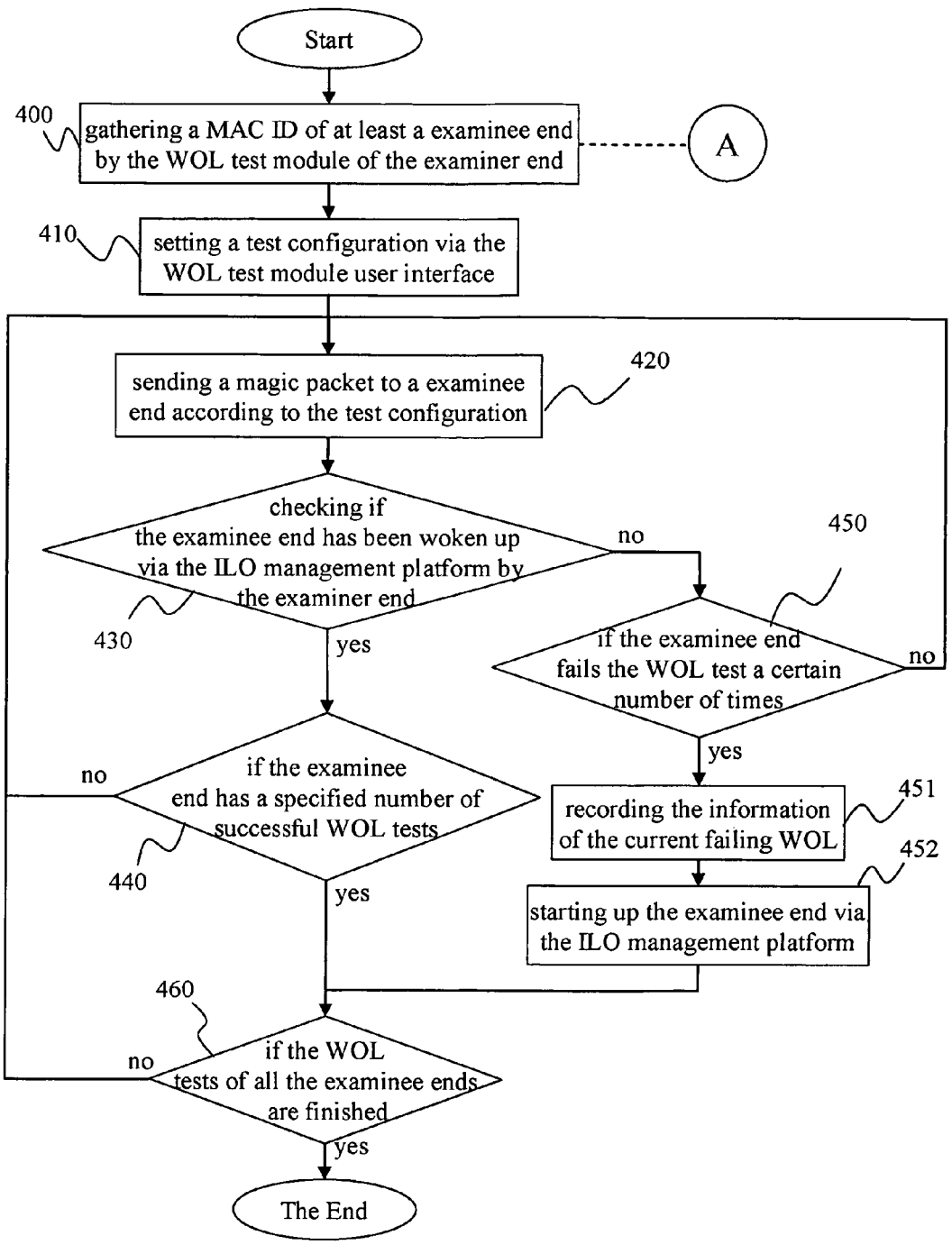
FIG. 2A is a flowchart illustrating steps of the test method of Wake On LAN (WOL) of this invention.
Figure 2B:
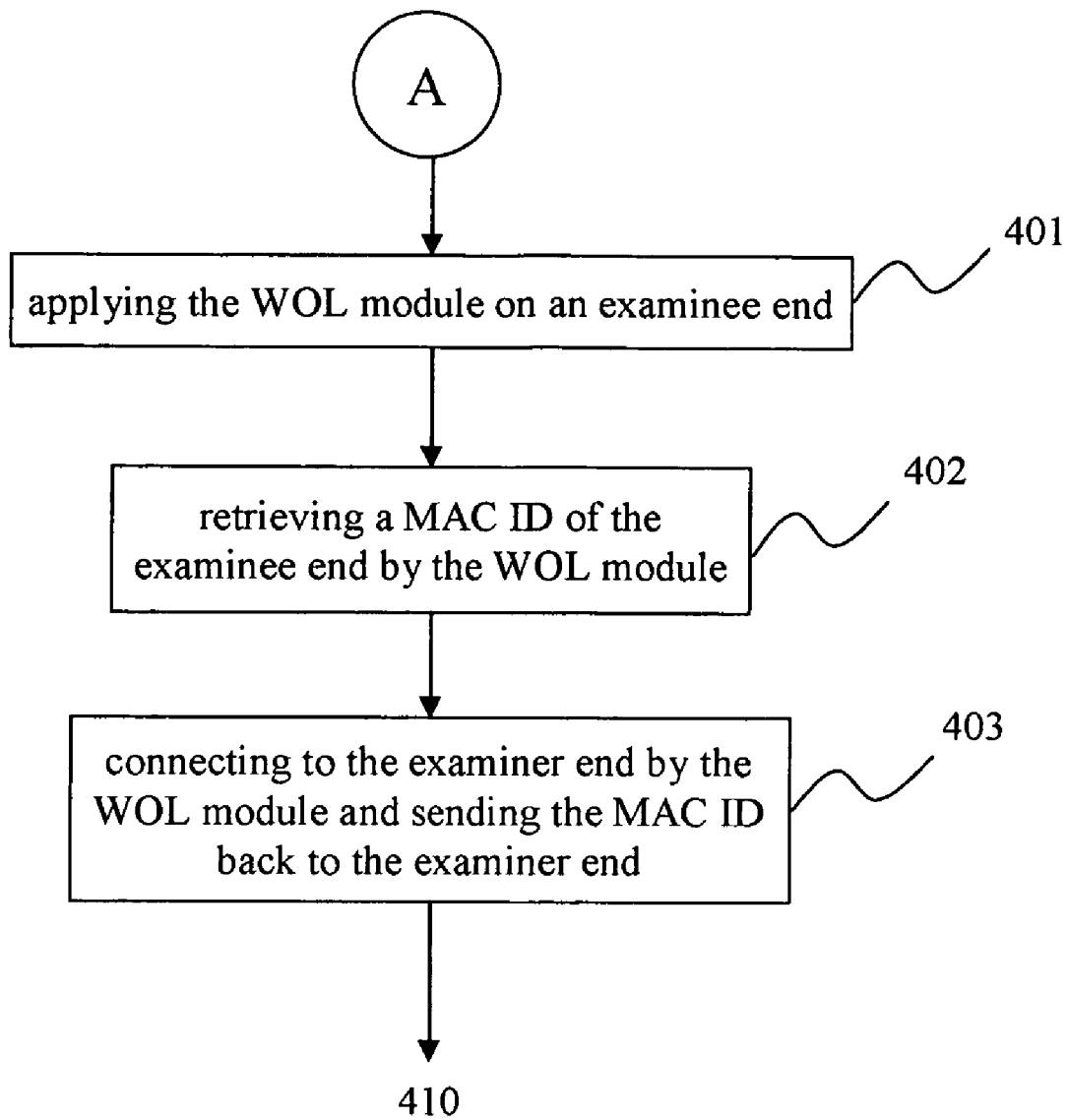
FIG. 2B is a flowchart illustrating detailed procedure A of the test method of Wake On LAN (WOL) of this invention.

Refer to FIG. 2A. The flowchart in FIG. 2A illustrates steps of the test method of Wake On LAN (WOL) of this invention. As shown in FIG. 2A, the test method of Wake On LAN (WOL) of this invention is applied under the Client/Server structure of an examiner end 100 and an examinee end 200. The test method of Wake On LAN (WOL) comprises steps as follows. Gathering a MAC ID of the network card 2001 of an examinee end 200 by the WOL test module 110 of an examiner end 100 (Step 400). Setting a test configuration via the WOL test module user interface 120 (Step 410). Sending a magic packet to the examinee end 200 according to the test configuration (Step 420). After sending out a magic packet, checking if the examinee end 200 has been woken up via the ILO management platform 130 by the examiner end 100 (Step 430). In Step 430, if the examinee end 200 has been woken up, that is, the WOL is successful, then the system checks if the examinee end 200 has a specified number of successful WOL tests (Step 440), to see how many times the examinee end 200 was successfully WOL; but if in Step 430 the examinee end 200 has not been woken up, that is, the WOL fails, the system checks if the examinee end 200 fails the WOL test a certain number of times (Step 450). In the above-mentioned Step 440, if the examinee end 200 is successfully WOL a number of times, then checking if the WOL tests of all the examinee ends 200~20n is finished (Step 460); but if the examinee end 200 does not successfully WOL a certain number of times, the procedure returns back to Step 420 to continue repeating tests. In the above-mentioned Step 450, if the examinee end 200 fails to WOL a certain number of times, the procedure also returns back to Step 420 to continue repeating tests. But in Step 450, if the examinee end 200 fails to WOL a certain number of times, then recording the information of the current failing WOL (Step 451); starting up the examinee end 200 via the ILO management platform 130 (Step 452) and aborting the WOL test toward the examinee end 200. After Step 452, the procedure goes to Step 460. In Step 460, if the WOL tests of all the examinee ends 200~20n are not finished, the procedure returns to Step 420 to continue the WOL test toward the next examinee end 200; or ends the procedure if all the WOL tests are finished.

Wherein Step 400 further comprises a detailed procedure A illustrated in FIG. 2B. Refer to FIG. 2B, the detailed procedure A comprises steps as follows. Applying the WOL module 2001 on the examinee end 200 (Step 401). Retrieving a MAC ID of the examinee end 200 by the WOL module 2001 (Step 402). Connecting to the examiner end 100 by the WOL module 2001 and sending the MAC ID back to the examiner end 100 (Step 403). After Step 403, the examiner end 100 gathers all the MAC IDs of network card 2002-20n2 of the examinee end 200~20n, and the procedure goes to Step 410.

Although the present invention has been described in considerable detail with reference certain embodiments thereof, other embodiments are possible. Therefore, their spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A Wake On LAN (WOL) test system, comprising:
a network domain;
an examiner end, a server end in the network domain, having a WOL test module, the WOL test module providing a user interface for setting a test configuration and sending out a magic packet according to the test configuration, wherein the magic packet is an information containing the MAC ID of the network card of the computer to be woken on LAN in any network transport protocol,
wherein the WOL test module user interface comprises a MAC ID list, a test configuration list, instantaneous test info, displaying instantaneous test progress, test results in HTML format, a test function option and a test event list, wherein the test function option comprises any combinations of follows: the Shutdown/Hibernate, the Shutdown Test, the Power Hibernate, the Hibernate & Resume, the Power Shutdown, and the Power Cycle, wherein the test event list provides displaying, all of the test function options of the examinee end in batch;

at least an examinee end, a client end in the network domain, having a WOL module for retrieving at least one MAC ID and uploading the MAC ID to the examiner end, and while receiving the magic packet, the WOL module wakes the examinee end; and an ILO (Integrated Lights-Out) management platform, a remote management service platform of the examiner end, providing the examiner end for querying the examinee end and operating the examinee end, wherein the ILO management platform is a remote management service platform provided by the ILO (Integrated Lights-Out) chip on the system board, wherein the examiner end checks if the examinee end has been woken up via an ILO (Integrated Lights-Out) management platform, wherein the examiner end checks, if the examinee end fails the WOL test a certain number of times if the checking result of the examinee end has not been woken up;

wherein the examiner end sends another magic packet to the examinee end according to the test configuration if the examinee end has not attained to a number of times of the failing WOL, wherein the examiner end checks if the examinee end has a specified number of successful WOL tests, and the examiner end sends another magic packet to the examinee end according to the test configuration if the checking result of the examinee end has not had a specified number of successful WOL tests, wherein the examiner end checks if the WOL tests of all the examinee ends are finished, the examiner end continues the WOL test toward the next examinee end if the checking result of the WOL tests of all the examinee ends are not finished.

2. A test method of Wake On LAN (WOL), comprising the following steps:

gathering a MAC ID of at least an examinee end by a WOL test module of an examiner end, comprising:

applying the WOL module on the examinee end; retrieving a MAC ID of the examinee end by the WOL module; and connecting to the examiner end by the WOL module and sending the MAC ID back to the examiner end, wherein the examinee end is a client end and the examiner end is a server end in a network domain;

setting a test configuration via a WOL test module user interface, wherein the WOL test module user interface comprises a MAC ID list, a test configuration list, an instantaneous test info, displaying instantaneous test progresses, test results in HTML format, a test function option and a test event list, wherein the test function option comprises any combinations of follows: the Shutdown/Hibernate, the Shutdown Test, the Power Hibernate, the Hibernate & Resume, the Power Shutdown, and the Power Cycle, wherein the test event list provides displaying all of the test function options of the examinee end in batch;

sending a magic packet to the examinee end according to a test configuration, wherein the magicpacket is an information containing the MAC ID of the network card of the computer to be woken on LAN in any network transport protocol;

checking if the examinee end has been woken up via an ILO (Integrated Lights-Out) management platform by the examiner end wherein the ILO management platform is a remote management service platform provided by the ILO (Integrated Lights-Out) chip on the system board;

if the checking result of the examinee end has not been woken up, checking if the examinee end fails the WOL test a certain number of times;

if the examinee end has not attained to a number of times of the failing WOL, the examiner end sends another magic packet to the examinee end according to the test configuration;

if the checking result of the examinee end has failed the WOL test a certain number of times, recording the information of the current failing WOL, and starting up the examinee end via the ILO management platform by the examiner end;

checking if the examinee end has a specified number of successful WOL tests;

if the checking result of the examinee end has not had a specified number of successful WOL tests, the examiner end sends another magic packet to the examinee end according to the test configuration;

checking if the WOL tests of all the examinee ends are finished; and if the checking result of the WOL tests of all the examinee ends are not finished the examiner end continues the WOL test toward the next examinee end.

* * * * *